United States Patent
Hansen

(10) Patent No.: US 9,718,572 B2
(45) Date of Patent: Aug. 1, 2017

(54) RECEPTACLE HAVING A PREMOLDED INSERT WITH A SURFACE IRREGULARITY

(76) Inventor: Bernd Hansen, Sulzbach-Laufen (DE)

( * ) Notice: Subject to any disclaimer, the term of this patent is extended or adjusted under 35 U.S.C. 154(b) by 939 days.

(21) Appl. No.: 12/448,502

(22) PCT Filed: Dec. 4, 2007

(86) PCT No.: PCT/EP2007/010499
§ 371 (c)(1),
(2), (4) Date: Jun. 23, 2009

(87) PCT Pub. No.: WO2008/098602
PCT Pub. Date: Aug. 21, 2008

(65) Prior Publication Data
US 2010/0025354 A1    Feb. 4, 2010

(30) Foreign Application Priority Data
Feb. 15, 2007   (DE) .......................... 10 2007 007 474

(51) Int. Cl.
| | | |
|---|---|---|
| *B65D 1/02* | (2006.01) | |
| *B29C 70/74* | (2006.01) | |
| *B65D 8/00* | (2006.01) | |
| *B65D 47/18* | (2006.01) | |
| *B65D 51/22* | (2006.01) | |

(Continued)

(52) U.S. Cl.
CPC .......... *B65D 1/0246* (2013.01); *B29C 70/742* (2013.01); *B65D 11/04* (2013.01); *B65D 47/18* (2013.01); *B65D 51/221* (2013.01); *B29C 49/00* (2013.01); *B29C 57/02* (2013.01); *B29C 2791/001* (2013.01)

(58) Field of Classification Search
CPC .... B65D 39/08; B65D 39/10; B65D 43/0281; B65D 51/1688
USPC .............. 215/44, 47, 329, 48, 330, 331, 40; 220/278; 264/259
See application file for complete search history.

(56) References Cited

U.S. PATENT DOCUMENTS 2,275,458 A * 3/1942 Nyberg ...................... 242/160.1
2,876,818 A * 3/1959 Raff et al. .................... 215/12.2
(Continued)

FOREIGN PATENT DOCUMENTS

DE         678 282 C        7/1939
DE         34 45 542 A1     6/1985
(Continued)

*Primary Examiner* — Anthony Stashick
*Assistant Examiner* — Ernesto Grano
(74) *Attorney, Agent, or Firm* — Wenderoth, Lind & Ponack, L.L.P.

(57) ABSTRACT

A receptacle, particularly a closed plastic ampoule produced in a blow molding method and filled in the mold, has a sleeve-type neck part (1) connected to a receptacle body (3) as an axial extension. The neck part forms a seat (11) for a pre-shaped insert (5) and is integrally molded in the mold onto a circumferential surface (9) of the insert (5). The circumferential surface (9) is equipped with at least one surface irregularity (21) having an enclosed base surface such that, due to the integral molding of the neck part (1) onto the circumferential surface (9) of the insert (5), a positive fit is present between the insert and the neck part (1). The fit forms a fixing element. The axial extension of the base surface of the surface irregularity (21) is only a small fraction of the axial extension of the circumferential surface (9).

31 Claims, 3 Drawing Sheets

(51) Int. Cl.
*B29C 49/00* (2006.01)
*B29C 57/02* (2006.01)

(56) References Cited

U.S. PATENT DOCUMENTS

| | | | | |
|---|---|---|---|---|
| 4,461,394 A | * | 7/1984 | Sendel et al. | 215/330 |
| 4,539,172 A | * | 9/1985 | Winchell et al. | 264/515 |
| 5,427,275 A | * | 6/1995 | Hansen | 222/83 |
| 2001/0000373 A1 | | 4/2001 | Beck | |
| 2006/0162596 A1 | * | 7/2006 | Faber | 101/333 |

FOREIGN PATENT DOCUMENTS

| | | | |
|---|---|---|---|
| DE | 10 2005 025 760 A1 | 12/2006 | |
| EP | 0 685 400 A2 | 12/1995 | |
| EP | 0 803 442 A2 | 10/1997 | |
| JP | 09-119598 | 5/1997 | |
| JP | 09-183428 | 7/1997 | |
| JP | 2000-033959 | 2/2000 | |
| JP | 2004-196417 | 7/2004 | |
| JP | 2006-306459 | 11/2006 | |
| WO | WO 95/25665 A1 | 9/1995 | |
| WO | WO 2005092727 A1 * | 10/2005 | B65D 39/08 |

* cited by examiner

RECEPTACLE HAVING A PREMOLDED INSERT WITH A SURFACE IRREGULARITY

FIELD OF THE INVENTION

The invention relates to a receptacle, especially a plastic ampule produced in a blow molding process and filled and sealed in the mold, with a sleeve-like neck part connected to the receptacle body as an axial extension and forming a seat for a premolded insert. The neck part is molded in the mold onto the peripheral surface of the insert. The insert peripheral surface is provided with at least one surface irregularity having a bounded base surface. By molding the neck part onto the peripheral surface of the insert, a positive locking forms a fixing element between the neck part and the insert.

BACKGROUND OF THE INVENTION

Receptacles of this type, in which the receptacle body is produced from a thermoplastic material, such as high density or low density polyethylene, polypropylene or similar materials compatible with the intended container contents, are known, cf. EP 0 803 442 B1. These receptacles are conventionally used to hold and dispense liquids for therapeutic or cosmetic purposes. The delivery of the liquid takes place via the insert sitting in the neck part of the receptacle body, with an exit or delivery end premolded according to the intended application, for example with a dropper-forming outlet for direct delivery of drops, for example of eye drops, after clearing the dropper opening. This clearing generally takes place by unscrewing the receptacle cap. In these receptacles, on the delivery region of the insert, a Luer® connection can also be provided. Regardless of the special execution of the delivery region, the end region can be covered by an end cap or sealing cap removed from the insert before using the contents of the container.

In intensive use with the corresponding loads acting on the delivery region of the insert, the danger exists that the insert in the seat of the neck part of the receptacle body will become loose or detached from it, allowing the receptacle contents to run out. To minimize this danger, in the known solution (EP 0 803 442 B1) ribs protruding on the peripheral surface of the insert are made as surface irregularities and extend at regular intervals from one another in the axial direction essentially over the entire axial extension of the peripheral surface. Together with the molded-on neck part of the receptacle body, these ribs form toothing by which the insert is locked against turning in the neck part. While this toothing is suited for accommodating torques, these ribs extending parallel in the axial direction do not offer adequate protection against axial movements of the insert relative to the neck part. To counteract this axial movement, the upper end region of the peripheral surface of the insert in the known solution offers a radially projecting flange around which the material of the neck part is molded. The plastic material of the neck part then extends over the two side surfaces of the flange of plastic material. Aside from the fact that a radially projecting bead over which the plastic material of the neck part extends leads to a less pleasing appearance, there is the disadvantage of complex execution of the molding device and of the prefabricated insert itself.

DE 10 2005 025 760 A1 furthermore discloses a receptacle, especially a plastic ampule produced especially in a blow molding process and filled and sealed in the mold, with a neck part connected to the receptacle body and onto which a first cap part can be screwed. A second cap part extends at least partially between the first cap part and the neck part and is provided with an opening means for opening the receptacle body having at least one opening sealable by the first cap part. By screwing on the first cap part, it entrains the second cap part such that the opening means formed generally in the manner of an opening spike causes opening of the receptacle. After unscrewing the first cap part, a closure part in the manner of a sealing plug clears the opening of the opening means. The second cap part then remains on the neck part. In this way two different opening versions can be implemented with only one receptacle, with an open cap arrangement and with a spike opening means which can puncture the membrane-like closed delivery opening.

SUMMARY OF THE INVENTION

An object of the invention is to provide a receptacle ensuring reliable fixing of the insert in position in the neck part of the receptacle body and having a simple and optically pleasing configuration.

According to the invention, this object is basically achieved by a receptacle, instead of ribs extending in the axial direction essentially over the entire peripheral surface, having one or more surface irregularities of axially limited extension. These irregularities produce positive locking between the insert and molded-on neck part of the receptacle body acting against the torques and axial forces.

In advantageous embodiments, the surface irregularity is formed by a nub. Each nub, viewed in cross section, can be circular, semicircular or polygonal, especially triangular or square.

In especially advantageous embodiments, the nubs form a semi-spherical convexity, preferably on the peripheral surface of the insert a projecting elevation. Inwardly pointed nubs could be formed, specifically by depressions in the peripheral surface of the insert. Preferably, with a circularly cylindrical peripheral surface of the insert, the nubs are located or distributed on at least one circular line extending in the peripheral direction.

In especially preferred embodiments the nubs are located on several circular lines extending at an axial distance from one another.

Different pattern arrangements of the nubs can be used. For example, the nubs can be located offset to one another in adjacent circular lines in the peripheral direction.

There can also be differently dimensioned and/or shaped nubs in the circular lines.

For especially preferred embodiments, the receptacle has a sealing cap screwable onto the outer thread of the insert. This receptacle can also be provided with an inner spike for puncturing a delivery opening on the insert when screwed on.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
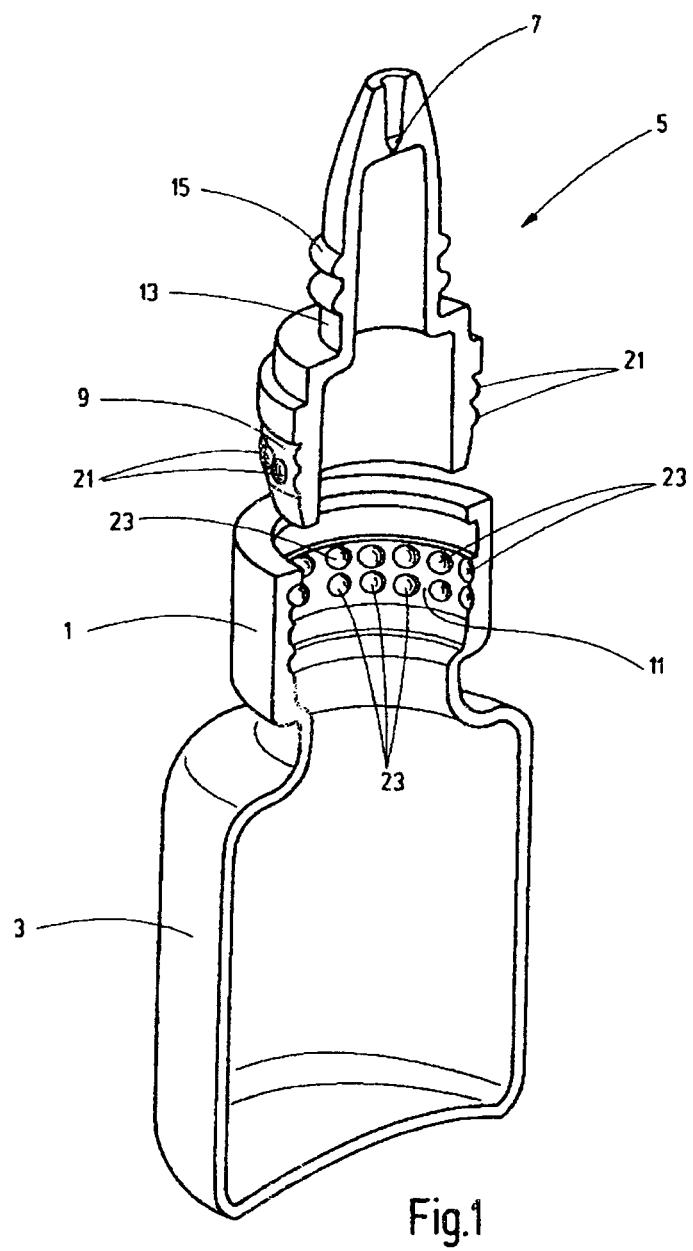
FIG. 1 is an exploded perspective view in section of a receptacle according to a first exemplary embodiment of the invention with the insert shown in a position removed from the neck part of the receptacle body.

The invention will be described below using embodiments in which in the neck part 1 of an ampule-like receptacle body 3 receives an insert 5 made as a dropper. The insert has a delivery opening 7 from which the container contents can be delivered drop by drop, for example a liquid for therapeutic or cosmetic purposes, such as eye drops or the like. As detailed below, the insert can also be made and shaped differently, provided that it has a peripheral surface 9 fixable in a seat 11 of the sleeve-shaped neck part 1 of the receptacle body 3. In the embodiments shown in the drawings, the insert is a hollow body with a circular cylindrical peripheral surface 9 connected to a delivery part 13 tapering toward the end-side delivery opening 7. On the peripheral region of the delivery part 13, an outside thread 15 is provided for mating and threadedly engaging with the inside thread 17 of a sealing cap 19 shown only in FIG. 5.

In production according to one of the conventional blow molding processes, the receptacle body 3 is molded without the final shaping of the neck part 1. In the mold then the container contents are added. Before final shaping of the neck part 1, the premolded insert 5 is then positioned in the mold such that it is located in the position in which movable mold jaws mold the neck part 1. The neck part is molded with its inside forming the seat 11 to the outside of the peripheral surface 9 of the insert 5. As is apparent from the drawings, the peripheral surface 9 does not form a continuous surface, but has surface irregularities formed in the illustrated examples by elevations projecting laterally from the peripheral surface 9 and having axial and peripheral opposing surfaces. In the illustrated examples, the irregularities are nubs 21, not all numbered in FIGS. 2 and 4. When the neck part 1 is molded onto the nubs 21, the inner surface of the seat 11 of the neck part 1 is formed with the corresponding depressions 23 having axial and peripheral opposing surfaces pressed in by the nubs 21 projecting on the insert 5 which is of relatively more stable shape. Instead of the projecting nubs 21 on the insert 5, depressions can be provided on the insert into which the plastic material of the neck part in nub shapes would enter when the neck part 1 is molded onto the seat 11. In any case the surface irregularities on the peripheral surface 9 of the insert 5 when the neck part 1 is molded on cause positive fixing of the insert 5 relative to the receptacle body 3 against both axial movements and rotary movements.

Figure 2:
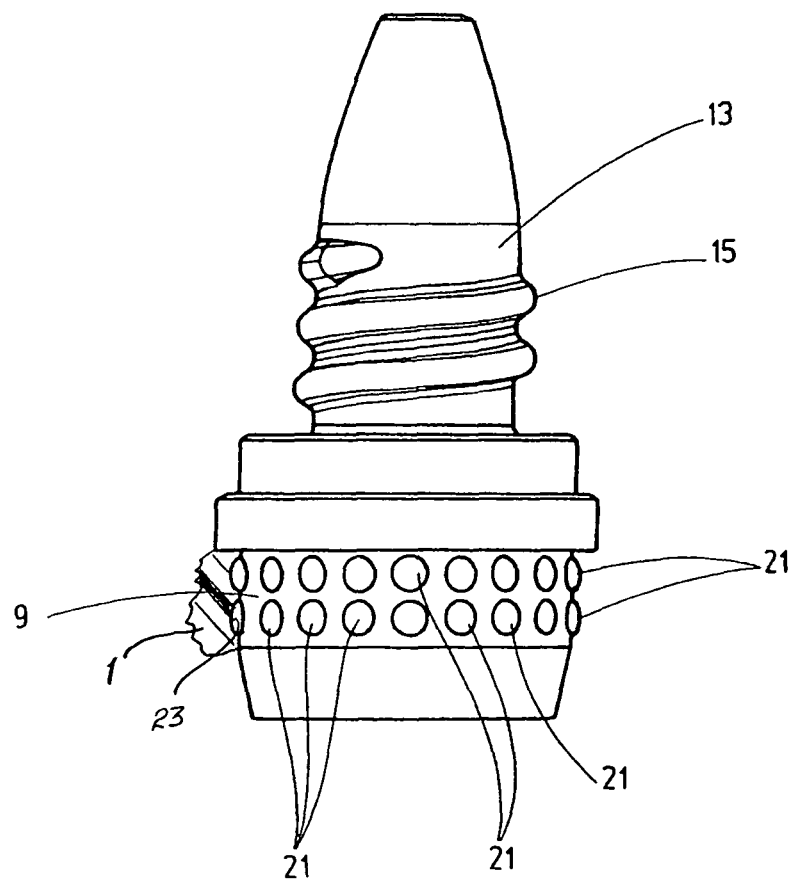
FIG. 2 is a partial side elevational view in section of the receptacle of FIG. 1, drawn slightly enlarged and only showing a portion of the neck part.
Figures 3, 4:
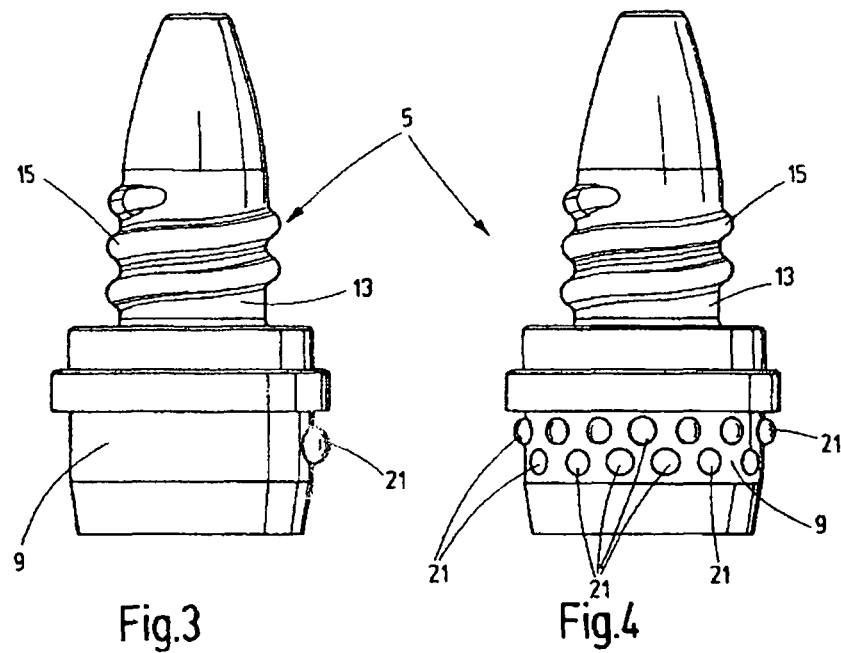
FIG. 3 is a side elevational view of an insert according to a second exemplary embodiment of the invention.
FIG. 4 is a side elevational view of an insert according to a third exemplary embodiment of the invention.

While FIG. 3 shows an embodiment in which simply a small number of nubs, only one nub 21 is visible, FIGS. 1, 2 and 4 show a pattern arrangement of nubs 21 with the nubs 21 arranged or distributed in the peripheral direction of the peripheral surface 9 on circular lines extending parallel to one another. FIG. 2 shows an example in which the nubs 21 of the two rows are arranged flush or aligned in the axial direction. FIG. 4 shows an example in which the nubs 21 of the two rows are arranged "staggered" or laterally offset relative to one another in the peripheral direction. While the figures show nubs 21 of semi-spherical shape made and dimensioned identically, nubs of different sizes and shapes can be formed, which nubs can differ within the rows and/or from row to row.

Figure 5:
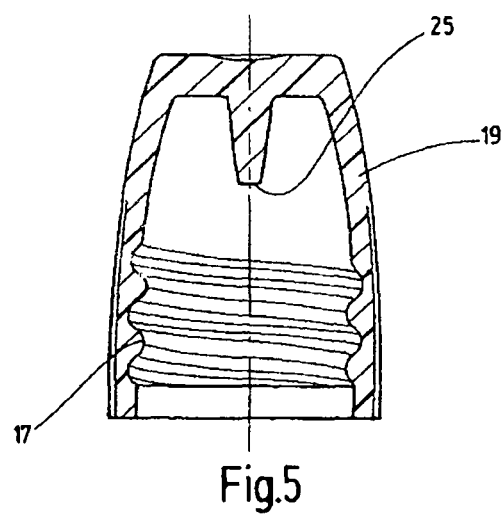
FIG. 5 is an enlarged side elevational view in section of a sealing cap as a component of the receptacle for embodiments according to FIGS. 1 to 4.

FIG. 1 shows that the delivery opening 7 is premolded, but closed on the inner end. As already mentioned, FIG. 5 shows a sealing cap 19 which can be screwed onto the outer thread 15 of the insert 5 with its inside thread 17. As is likewise to be seen from FIG. 5, the sealing cap 19 on the cap bottom has a central, protruding spike 25 arranged and dimensioned such that when the cap 19 is screwed completely onto the insert 5 the delivery opening 7 is closed by the spike 25. The spike 25 could also be made such that it punctures a hermetically sealed container opening in the screwing-on process.

While in the illustrated embodiments the insert 5 has one delivery part 13 forming a type of dropper, inserts of any type or shape, on the peripheral surface of which the neck part 1 of the pertinent receptacle body 3 can be molded such that surface irregularities provided on the peripheral surface 9 with axial and spherical extensions which are much smaller than the axial and peripheral extensions of the peripheral surface 9, form a connection with the neck part. Thus, for example, the insert could have a stopper part which can be punctured by an injection needle, a discharge opening which can be closed for example by a screw closure and which is dimensioned to be larger, a means for a Luer® connection, a molded-on closure which can be manually unscrewed at a scored site by means of a screw cap, or the like.

While various embodiments have been chosen to illustrate the invention, it will be understood by those skilled in the art that various changes and modifications can be made therein without departing from the scope of the invention as defined in the appended claims.

What is claimed is:

1. A plastic ampule produced in a blow molding process and filled and sealed in a mold, comprising:
 a receptacle body;
 a premolded insert having an outer peripheral surface with a plurality insert surface irregularities each having a bounded base surface, said peripheral surface being a circular cylinder;
 a sleeve shaped neck part connected to and axially extending from said receptacle body and forming a seat receiving said insert, said neck part being molded onto said peripheral surface of said insert thereby forming a plurality of neck surface irregularities on an inner surface of said seat mating with said insert surface irregularities to lock positively said insert and said neck part against translational and rotational movements, said irregularities being laterally projecting nubs and laterally extending depressions on said peripheral surface and said neck part, said nubs being arranged on plural circular lines extending about an axis of said circular cylinder and at an axial distance from one another, said nubs on adjacent circular lines being offset from one another in peripheral directions;
 each of said nubs having axial and peripheral opposing surfaces; and
 each of said depressions forming receiving and mating with one of said nubs.

2. A plastic ampule according to claim 1 wherein each said nub is said insert surface irregularity; and each said depression is said neck insert irregularity.

3. A plastic ampule according to claim 1 wherein
said nubs are one of differently dimensioned or shaped.

4. A plastic ampule according to claim 1 wherein
said insert comprises a hollow body having an elongated delivery part adjoining an end of said peripheral surface and tapering to a delivery end thereof with an initially closed and clearable delivery opening thereon.

5. A plastic ampule according to claim 4 wherein
said delivery opening is clearable by an actuating element.

6. A plastic ampule according to claim 5 wherein
said actuating element comprises a sealing cap having an inner thread engagable with an outer thread on an outer surface of said insert adjacent said elongated delivery part and an inner spike sealing said delivery opening when said sealing cap is threadedly engaged on said insert.

7. A plastic ampule according to claim 1 wherein
each said insert surface irregularity extends in axial and peripheral directions thereof between said opposing surfaces only a small fraction of axial and peripheral extents, respectively, of said peripheral surface.

8. A plastic ampule produced in a blow molding process and filled and sealed in a mold, comprising:
a receptacle body;
a premolded insert having an outer peripheral surface with at least one semi-spherical insert surface irregularity having a bounded base surface, said peripheral surface being a circular cylinder;
a sleeve shaped neck part connected to and axially extending from said receptacle body and forming a seat receiving said insert, said neck part being molded onto said peripheral surface of said insert thereby forming a semi-spherical neck surface irregularity on an inner surface of said seat mating with said insert surface irregularity to lock positively said insert and said neck part against translational and rotational movements;
a plurality of laterally projecting nubs with axial and peripheral opposing surfaces forming said insert surface irregularity; and
a plurality of laterally extending depressions forming said neck surface irregularity to receive and mate with said nub, said nubs being arranged on plural circular lines extending about an axis of said circular cylinder and at axial distances from one another, said nubs on adjacent circular lines being offset from one another in peripheral directions.

9. A plastic ampule according to claim 8 wherein
said insert comprises a hollow body having an elongated delivery part adjoining an end of said peripheral surface and tapering to a delivery end thereof with an initially closed and clearable delivery opening thereon.

10. A plastic ampule according to claim 9 wherein
said delivery opening is clearable by an actuating element; and
said actuating element comprises a sealing cap having an inner thread engagable with an outer thread on an outer surface of said insert adjacent said elongated delivery part and having an inner spike sealing said delivery opening when said sealing cap is threadedly engaged on said insert.

11. A plastic ampule produced in a blow molding process and filled and sealed in a mold, comprising:
a receptacle body;
a premolded insert having an outer peripheral surface with a plurality of insert surface irregularities each having a bounded base surface;
a sleeve shaped neck part connected to and axially extending from said receptacle body and forming a seat receiving said insert, said neck part being molded onto said peripheral surface of said insert thereby forming neck surface irregularities on an inner surface of said seat mating with said insert surface irregularity to lock positively said insert and said neck part against translational and rotational movements;
laterally projecting nubs with axial and peripheral opposing surfaces forming one of said insert or neck surface irregularities, said nubs being one of differently dimensioned or shaped; and
laterally extending depressions forming the other of said insert or neck surface irregularities to receive and mate with said nubs.

12. A plastic ampule according to claim 11 wherein
each said nub is said insert surface irregularity; and
each said depression is said neck insert irregularity.

13. A plastic ampule according to claim 11 wherein
said peripheral surface is a circular cylinder; and
said nubs are arranged on at least one circular line extending about an axis of said circular cylinder.

14. A plastic ampule according to claim 13 wherein
said nubs are arranged on plural circular lines extending about said axis and at an axial distance from one another.

15. A plastic ampule according to claim 14 wherein
said nubs on adjacent circular lines are offset from one another in peripheral directions.

16. A plastic ampule according to claim 11 wherein
said nubs are one of differently dimensioned or shaped.

17. A plastic ampule according to claim 11 wherein
said insert comprises a hollow body having an elongated delivery part adjoining an end of said peripheral surface and tapering to a delivery end thereof with an initially closed and clearable delivery opening thereon.

18. A plastic ampule according to claim 17 wherein
said delivery opening is clearable by an actuating element.

19. A plastic ampule according to claim 18 wherein
said actuating element comprises a sealing cap having an inner thread engagable with an outer thread on an outer surface of said insert adjacent said elongated delivery part and an inner spike sealing said delivery opening when said sealing cap is threadedly engaged on said insert.

20. A plastic ampule according to claim 11 wherein
each said insert surface irregularity extends in axial and peripheral directions thereof between said opposing surfaces only a small fraction of axial and peripheral extents, respectively, of said peripheral surface.

21. A plastic ampule produced in a blow molding process and filled and sealed in a mold, comprising:
a receptacle body;
a premolded insert having an outer peripheral surface with at least one insert surface irregularity having a bounded base surface, said insert including a hollow body having an elongated delivery part adjoining an end of said peripheral surface and tapering to a delivery end thereof with an initially closed and clearable delivery opening thereon, said delivery opening being clearable by an actuating element, said actuating element including a sealing cap having an inner thread engagable with an outer thread on an outer surface of said insert adjacent said elongated delivery part and an inner spike sealing said delivery opening when said sealing cap is threadedly engaged on said insert;

a sleeve shaped neck part connected to and axially extending from said receptacle body and forming a seat receiving said insert, said neck part being molded onto said peripheral surface of said insert thereby forming a semi-spherical neck surface irregularity on an inner surface of said seat mating with said insert surface irregularity to lock positively said insert and said neck part against translational and rotational movements;
a laterally projecting nub with axial and peripheral opposing surfaces forming one of said surface irregularities; and
a laterally extending depression forming the other of said surface irregularities to receive and mate with said nub.

22. A plastic ampule according to claim 21 wherein
said nub is said insert surface irregularity; and
said depression is said neck insert irregularity.

23. A plastic ampule according to claim 21 wherein
said insert surface irregularity extends in axial and peripheral directions thereof between said opposing surfaces only a small fraction of axial and peripheral extents, respectively, of said peripheral surface.

24. A plastic ampule according to claim 21 wherein
a plurality of mating semi-spherical nubs and depressions are provided on said peripheral surface and said neck part.

25. A plastic ampule according to claim 24 wherein
said peripheral surface is a circular cylinder; and
said nubs are arranged on at least one circular line extending about an axis of said circular cylinder.

26. A plastic ampule according to claim 25 wherein
said nubs are arranged on plural circular lines extending about said axis and at an axial distance from one another.

27. A plastic ampule according to claim 26 wherein
said nubs on adjacent circular lines are offset from one another in peripheral directions.

28. A plastic ampule according to claim 24 wherein
each said insert surface irregularity extends in axial and peripheral directions thereof between said opposing surfaces only a small fraction of axial and peripheral extents, respectively, of said peripheral surface.

29. A plastic ampule according to claim 1 wherein
each said surface irregularity is semi-spherical.

30. A plastic ampule according to claim 11 wherein
each said surface irregularity is semi-spherical.

31. A plastic ampule according to claim 21 wherein
each said surface irregularity is semi-spherical.

* * * * *